(12) United States Patent
Reddy Av et al.

(10) Patent No.: US 11,106,539 B2
(45) Date of Patent: Aug. 31, 2021

(54) RULE BOOK BASED RETENTION MANAGEMENT ENGINE

(71) Applicant: EMC IP Holding Company LLC, Hopkinton, MA (US)

(72) Inventors: Mahesh Reddy Av, Bangalore (IN); Gururaj Kulkarni, Bangalore (IN); Swaroop Shankar D H, Bangalore (IN); Lakshminarayanan Muniswamy, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/170,738

(22) Filed: Oct. 25, 2018

(65) Prior Publication Data

US 2020/0133781 A1 Apr. 30, 2020

(51) Int. Cl.
*G06F 11/14* (2006.01)
*G06F 16/11* (2019.01)

(52) U.S. Cl.
CPC ...... *G06F 11/1448* (2013.01); *G06F 11/1461* (2013.01); *G06F 11/1464* (2013.01); *G06F 11/1469* (2013.01); *G06F 16/122* (2019.01); *G06F 16/125* (2019.01)

(58) Field of Classification Search
CPC ............ G06F 11/1448; G06F 11/1461; G06F 11/1464; G06F 11/1469; G06F 16/125; G06F 16/122; G06F 2221/0782
See application file for complete search history.

(56) References Cited

U.S. PATENT DOCUMENTS

| | | | | |
|---|---|---|---|---|
| 9,639,539 | B1 * | 5/2017 | Devta | G06F 16/185 |
| 2014/0075087 | A1 * | 3/2014 | Bartling | G06F 13/00 711/102 |
| 2016/0179853 | A1 * | 6/2016 | Bertin | G06F 16/113 707/662 |
| 2017/0032006 | A1 * | 2/2017 | Anglin | G06F 3/0604 |
| 2018/0276223 | A1 * | 9/2018 | Dhanasekaran | G06F 16/13 |
| 2018/0321879 | A1 * | 11/2018 | Lu | G06F 3/06 |

* cited by examiner

*Primary Examiner* — Masud K Khan (74) *Attorney, Agent, or Firm* — Workman Nydegger (57) ABSTRACT

Systems and methods for determining retention periods or policies for backups are disclosed. A rule book stores relationships between rules and recommended retention periods. Data related to a backup is collected and organized. A query is generated from the organized data and used to identify a rule from the rule book. The retention period corresponding to the identified rule in the rule book is then applied to the corresponding backup.

18 Claims, 5 Drawing Sheets

| Data Type | Data Change | Schedule | Storage | | | Storage Quota Available | Rule |
|---|---|---|---|---|---|---|---|
| | | | Primary | Disaster | Archival | | |
| File System | 10% | Weekly once FULL, INCR everyday | Disk | Cloud | Tape | 100 TB | FS_APDSK_DCLD_ATP_FULLW_INCRD_STRGTRUE |
| Exchange | 3% | Every 6 Hours INCR, Weekly Twice FULL | Disk | Cloud | Tape | 1000 TB | APPEXCH_PDSK_DCLD_ATP_FULLW@_INCRHR6_STRGTRUE |
| Database (SQL) | 5% | Every 5 Hours INCR, Weekly Thrice FULL | Disk | None | Disk | 1000 TB | APPSQL_PDSK_ADSK_FULLW#_INCRHR5_STRGTRUE |
| Oracle | 33% | Every 12 Hours INCR, Weekly once FULL | Cloud | Cloud | None | 1 TB | DBORCL_PCLD_DCLD_FULLW1_INCRHR12_STRGFALSE |
| Virtual Machine | 10% | Daily FULL | Disk | Cloud | Disk | 100 TB | VRTL_PDSK_DCLD_ADSK_FULLD1_INCR0_STRGTRUE |

Figure 3

| RULE | RRETENTION | RECOMMENDATION |
|---|---|---|
| FS_APDSK_DCLD_ATP_FULLW_INCRD_STRGTRUE | 6 Months Primary | 1. Archive up to 2 years.<br>2. Disaster up to 1 year. |
| APPEXCH_PDSK_DCLD_ATP_FULLW@_INCRHR6_STRGTRUE | 1 Year Primary | 1. Archive up to 5 years.<br>2. Disaster up to 2 years. |
| APPSQL_PDSK_ADSK_FULLW#_INCRHR5_STRGTRUE | 2 Months Primary | 1. Archive up to 2 years.<br>2. Disaster Not Available |
| DBORCL_PCLD_DCLD_FULLW1_INCRHR12_STRGFALSE | 1 Month Primary | 1. Storage Quota will be exceeded after 1 month. Must move data to archive concurrently.<br>2. Archive not available.<br>May consider moving to disaster storage. |
| VRTL_PDSK_DCLD_ADSK_FULLD1_INCR0_STRGTRUE | 75 Days Primary | 1. Storage quota will be exceeded after 75 days.<br>2. Move data to archive storage concurrently.<br>3. Distaster up to 6 months. |

RULE BOOK BASED RETENTION MANAGEMENT ENGINE

FIELD OF THE INVENTION

Embodiments of the present invention relate to systems and methods for performing data protection operations. More particularly, embodiments of the invention relate to systems and methods for performing backup operations and more particularly to determining retention periods and types.

BACKGROUND

One of the signature requirements of data protection applications is the requirement to backup data or create backups. Once the backups have been created, there is also a need to determine how long to keep the backups. These concerns are particularly important in the context of enterprise data backup retention. More specifically, data is scaling at a faster pace than before and there is a need to provide both a smooth recovery point while minimizing the storage requirements associated with data archival.

In fact, backup retention is distinct from simply archiving data. Archiving data is a way to retain the entire data set for a very long period of time. A backup, in contrast, is the way that a backup administrator preserves a pointer to the data for recovery purposes, such as during a disaster. It is difficult to restore from archived data and, in any event, restoring from archived data is uneconomical and ineffective.

The size of data can scale up to several Petabytes in an enterprise. The types of data, in addition, are heterogeneous. The data may include server data, file system data, application data, and the like. In addition to the type of data, other factors to consider for a retention policy may include the type of backups and the frequency of the backups. In fact, there are a plethora of factors to consider when defining a retention period for each backup. This is an extremely tedious task for a backup administrator in part because these factors may vary from day to day during each backup window.

In a typical enterprise backup scenario, the backup administrator decides the retention period and archival criteria for a particular backup based on the properties of the enterprise. The backup administrator then decides the retention time for a particular backup policy and associates the retention time to the backup policy which in turn gets labelled to that particular backup.

For instance, an enterprise may intend to restore its servers to a time where their servers would be working according to their needs. To accomplish this during a disaster, the enterprise would need to have a restore point and backups serve this purpose. In this example, there may be a daily backup for a week (7 restore points). At the end of a week, there may be a weekly backup which would be a weekly restore point (4 per month). Finally there may even be a monthly backup that serves as a restore point for that month. All of these restore points are usually based on loose assumptions by the backup administrator.

The below table illustrates certain factors that a backup administrator may consider in a typical enterprise and possible retention periods that may be decided.

| Factors under consideration | Retention Period |
| --- | --- |
| Server image backup to cloud and the backup frequency is daily | First backup would be retained for 2 years. Consecutive ones retained for about a month until a major update or patch is being applied on the server. Henceforth, the first backup again would have a longer retention for about a year. |
| Employee media files | Lowest retention for about a week. |
| SQL server database with all hospital records, being backed up on a daily basis and once a week and month consecutively. | Archive the monthly recover point for next 10 years. Retain weekly backup for a year and daily backups for a month, since there is going to be a fresh recover point at each month. |
| Virtual machines would have a snapshot at every month. Also, VM image backup taken on a daily basis. | Since there is already a snapshot every month, daily backups can be retained for about a month. Unless there is a specific change that could possibly result in a disaster, the retention need not be changed. |

This table demonstrates a form of linear decision making that is being taken by considering single dimensional factors or situations by a backup administrator. This is not effective because the factors affecting the retention of the data are multi-dimensional and such linear decisions may not be suitable in most of the cases. Also, each and every critical change to be tracked amidst the rapidly scaling data and irregular, unexpected disasters that can occur is be a tough task for a backup administrator. For these reasons, a backup administrator may end up imposing a higher/lower than needed retention policy on each backup, resulting in the improper usage of the storage capacity and increased chances of data loss.

More generally, in currently available solutions, an optimal retention policy is defined by a static value that is applied to the whole backup policy or by a tunable parameter that is defined by the backup administrator. Unfortunately, this method cannot intelligently adapt to the heterogeneous data in a scaled enterprise environment and cannot consider any other factors.

This results in a constant and redundant retention policy for heterogeneous data and increases the possibility of missing a restore point, which may result in data loss or data unavailability. In addition, these solutions result in the over utilization of storage space, incurring additional costs to the enterprise. There is a need for systems and methods to define retention policies in a more dynamic and effective manner.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to data protection systems and methods. Examples of data protection operations include, but are not limited to, retention operations, retention defining operations (e.g., retention periods), backup operations, restore operations, deduplication operations, and the like or combination thereof. Retention periods, by way of example, may include recommendations for how long to store a backup in primary storage, disaster recovery (DR) storage, and/or archival storage.

Embodiments of the invention relate to systems and methods for intelligently adapting to heterogeneous data and to determining an optimal retention policy or period for each kind or type of data. Embodiments of the invention consider multiple factors including, but not limited to, data source, data target, type or kind of storage, backup type (e.g., full, incremental), backup frequency, and the like when determining a retention policy for each backup.

Embodiments of the invention advantageously improve the manner in which storage capacity is utilized, for example, by precisely adjusting the retention period to the data being backed up. Embodiments of the invention also intelligently recommend retention periods in order to avoid data loss in some circumstances.

Embodiments of the invention relate to a retention management engine that intelligently tunes and decides (or recommends) the retention policy for each data (e.g., type of data) being backed up. The retention management engine may operate analytically and provides a rule-book based retention system. The retention management engine can consider multiple factors such as, but not limited to, the source host, the target device type, the policy property, etc. Consequently, the retention management engine decides the retention policy for a backup in a multi-dimensional way and queried against rules in the rule-book, which will provide an optimal retention period for such data.

One example of a factor that may impact the retention period is the type of workload and/or the type of data. The type of workload may play a role during data protection and classifying the workload based on its type or priority and retaining them would even play a role. For example and without restriction, for a workload associated with a server file system, it is often necessary to ensure that the data can be recovered to a desired restore point at any instant in time. As a result, the corresponding backups may be retained for 5 years or more. For a workload associated with a regulatory notice, a legal notification, media like images and videos, and finance related notifications, the data is typically not needed for more than a fixed amount of time—e.g., a few weeks in some cases. As a result, the retention period is set accordingly. In another example, the retention period for a SQL server database storing hospital/patient records may be years. In a contrasting example, the data associated with an Exchange database holding short-term notifications may be needed for a much shorter period.

Another factor that may impact the retention policy is the frequency backup. For a server file system, every backup that is taken at a daily frequency that includes the server file system data may be retained for a duration of more than a year such that the data can be restored during a disaster. Yearly or monthly backups can be retained until there is a next fresh and trust-worthy restore point. Most backups that happen before a possible outage and planned shutdown need not be retained for long because there should always be a planned restore point before and after such down times.

Another factor that may impact the retention policy is the type of backup. Each backup may be distinctive in nature based on the type of data. The possible kinds of backups may include, but are not limited to, an image backup, a database level backup, a volume level backup, a typical bare metal recovery-disaster backup, full backups, incremental backups, and/or a single file backup as well. An image backup of a server could be retained until a major change is applied to the system under interest that could possibly result in a disaster. Retaining this type of backup on a regular basis for a higher period is not effective because the image backups may hold data on the order of tens of gigabytes.

Other considerations that may impact or help define a retention policy include the storage quota per unit, type of storage like tapes, cloud or servers, rate of data growth, archival needs, and the like or combination thereof. These examples demonstrate that different types of data may have different retention needs. The linear approach of conventional systems is unable to accommodate these differences and is unable to accommodate changing situations.

Figure 1:
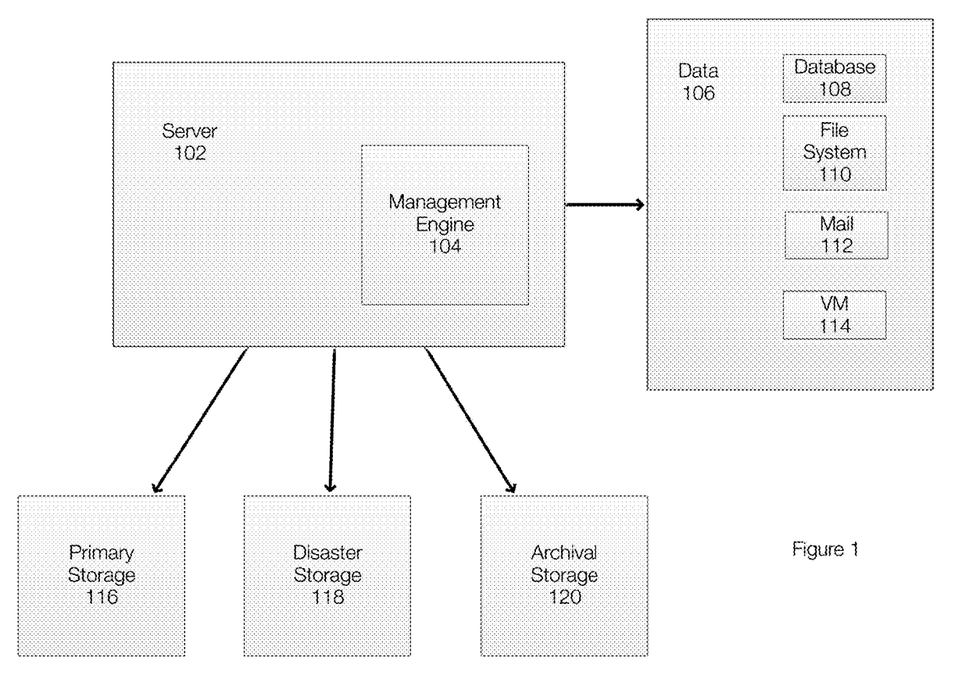
FIG. 1 is a block diagram illustrating an example of a computing system for implementing systems and methods for data retention.

FIG. 1 illustrates an example of a data protection system configured to perform data protection operations including, but not limited to determining, defining, refining, changing, and/or improving retention policies. Advantageously, the data protection system can adapt to real time changes in the data and is configured to learn and improve. Using historical data (such as historical rules and/or retention period recommendations), subsequent recommendations can be improved. This is an example of machine learning where the data can be used as training data for subsequent processing. Subsequent processing may include generating subsequent retention recommendations for the various backups generated by the data protection system.

FIG. 1 illustrates a server 102 (e.g., a backup or data protection server) that is configured to perform data protection operations on the data 106. The data 106 is typically stored in appropriate storage devices, which may include local devices, cloud based systems, or the like. The server 102 may cooperate with a client machine or agent operating on the client machine or device to perform the data protection operations.

In this example, the data 106 includes heterogeneous data. The data may include, but is not limited to, database(s) 108, a file system 110, email/calendaring data 112, virtual machines 114, and the like. The server 102 may store backups using different storage for different types of backups. Further, the backup types and frequencies may vary. The storage may include primary storage (e.g., disk, flash) 116, disaster storage 118 (e.g., cloud storage), and/or archival storage (e.g., tape).

In one example, the data 106 (or a portion thereof) is backed up to the primary storage 116. The backups can then be replicated or copied to the disaster storage 118 and/or archived in the archival storage 120. This allows various retention periods to be defined at least in terms of storage type.

The server 102 may include or is associated with a management engine 104 (a retention management engine). The management engine 104 is configured to recommend retention periods or policies for the various types of data 106.

The management retention engine 104 or the method of determining and implementing a retention policy may be accomplished in stages. In the first stage, the retention management engine 104 may monitor the sources (data/applications being backed up) as well as the target devices (destination devices). The retention management engine 104 may monitor, by way of example only, data growth rate, data type, backup device type, backup level, backup frequency and type, existing backup data, historical events on the data, and/or the application. This data that is gathered or collected is then analyzed and segregated in a readable form. The collected data may be organized into organized data, such as a query. In effect, the organized data represents a rule.

Next, the rule formed in the first stage is queried against existing rules in the rule book that have or are associated with pre-defined retention policies. When a rule is found, the retention period may be set in accordance with the rule. If the rule is not found, a new rule may be generated. The new rule may correspond to the query. Alternatively, the new rule may be based on a closest rule found in the rule book. In addition, the new rule can be updated over time based on the historical data that is continually updated and evaluated. In one example, the queries for which no match is found in the rule book may be prioritized in a high, medium, and low retainable format. The new rule can be pushed or added to the rule book and associated with a retention period.

Figure 2:
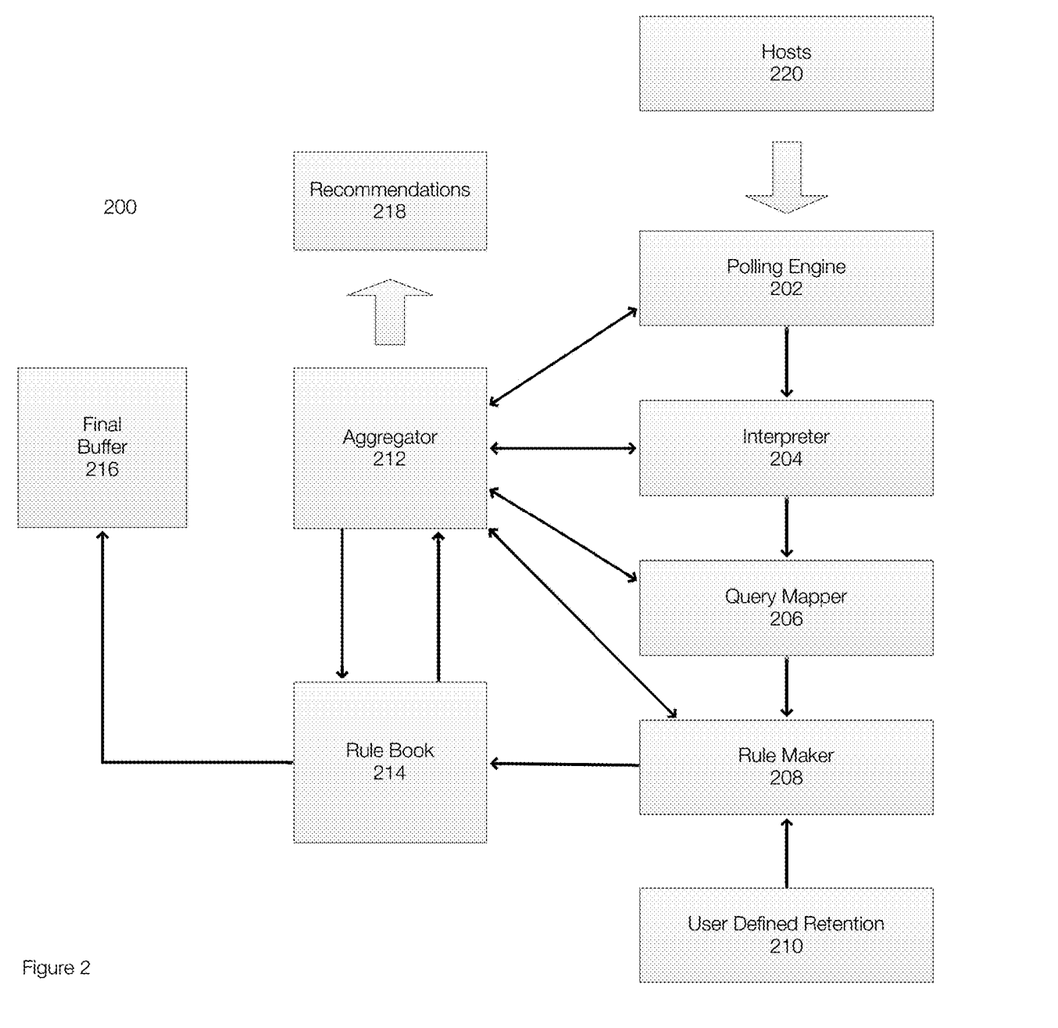
FIG. 2 is a block diagram illustrating an example of a system for defining a retention policy or for managing backups in a computing environment.

FIG. 2 illustrates an example of a retention management engine 200, which is an example of the management engine 104. In FIG. 2, the retention management engine 200 includes a rule book 214. The rule book 214 includes or stores a set of rules that are defined by the backup application (or backup server). The set of rules may also include user defined rules. These rules may be pre-defined in one example. When a query for a particular data or backup is performed in the rule book 214 and a match is found, the retention period is set in accordance with the rule in the rule book 214. The retention policy may also be published to the final buffer 216.

In this example, the polling engine 202 polls hosts 220 (continually, periodically, or the like) for information required by the backup application and more particularly for information used by the retention management engine 200. The polling engine 202 may gather or collect information including, but not limited to, information about the source or host server, the storage provider, the target device, and other lateral factors.

The interpreter 204 receives the raw data from the polling engine 202 and converts the raw data received by the polling engine 202 into a segregated format or into organized data. The organized data may include the different factors that will be used to form a query. The organized data may, in one example, be representative of a query.

The query mapper 206 uses the segregated or organized data formatted or organized by the interpreter 204 to form the query. The query, in one example, reflects the factors associated with a backup operation of a particular host. Thus, if the host or source is a database, then the query represents the factors associated with backing up a database. This allows embodiments of the invention to adapt the retention policies to the various data types that may be present in the data. Further, the retention policies are specific to the data types in one example.

In addition to the query received from the query mapper 206, the rule maker 208 may receive the user defined retention 201 (or user defined rule). The rule maker then structures or generates the final rule that will be queried against the rule book 214. The rule book 214 will include multiple rules for different cases that include the multi-dimensional factors that define or that are associated with the retention period. More specifically, the rule book 214 may be a database that stores several queries and their associated retention periods. If the rule used to query the rule book 214 is found, the respective retention period associated with that rule is provided to the aggregator 212 and the final buffer 216. The final buffer 216 may push the new rule to the policy engine that enforces the retention period for that backup. The aggregator 212 may also provide recommendations 218 to an end user. These recommendations 218 may change over time as the management engine 200 learns from previous recommendations, new rules, and the like.

For example, the aggregator 212 will monitor each and every block or component in the management engine 200. The aggregator 212 will indicate new recommendations 218 to the user as well as these systems in order to improve the retention and decision making capability. The aggregator 212 may add new rules to the rule book 214, new categories to the data interpreter 204, control polling permissions (e.g., frequency, devices, times, data types, etc.) of the polling engine 202, and the like.

The aggregator 212 may operate as an analytical model. The aggregator 212 may fetch data from each component into its historic data collection. For example, each and every operation, rule, query, outcome of the query, policy by the admin, override by the admin, etc. would be gathered eventually by the aggregator 212. From the gathered or historical data, the aggregator 212 may fetch certain queries which are least used and frequently overridden by the admin, and indicate to the query mapper 206 and the rule maker 208 to make these queries obsolete or of low priority. Thus, recommendations that are not acceptable are no longer made or made less frequently.

Additionally, the aggregator 212 may also check for the policies that are frequently being implemented manually by the administrator. The aggregator 212 may communicate with one or more of the components of the management engine 200 in order to train those components for that particular policy and to create a rule for that policy. This allows a rule to be created and recommended that is currently being implemented manually.

In another example, whenever certain policies are being used in an event where a similar event from the historical data indicates that the user had overridden that particular policy for the same event, then the aggregator would provide a warning/recommendation indicating the same to the end user.

The aggregator 212 can be implemented using a machine learning model or an analytical model with advanced log search pattern and data lake storage features.

Thus, the aggregator 212 is a component that communicates with other components of the management engine 200. The aggregator may cache user defined rules, historical data (e.g., data and conditions received by the polling engine 202 and their respective retentions, rules, polling data, data organized by the interpreter 204, queries, rules, proposed rules or the like). This data can be used to improve the accuracy of the rule book 214 and the optimal retention for specific data.

The aggregator 212 may add new rules to the rule book 214, new categories or factors to the data interpreter 204, control polling permissions of the polling engine 202, or the like or combination thereof.

The aggregator 212 or the rule book 214 may also be able to notify a user such as a backup administrator regarding the disadvantages of the present retention policy (e.g., running out of space, potential data loss, and the like).

In summary, the management engine 200 includes the rule book 214 that has a set of rules that are defined by the backup application, as well as, user defined rules. The polling engine 202 continuously or periodically polls for the required data from the backup application, host server and storage provider and other lateral factors. The data interpreter 204 converts the raw data from polling engine 202 into a segregated format to fit into the different factors which will further be used to form a query. The query mapper 208 will use the segregated or organized data from the data interpreter and form a query which is more understandable and aligned towards the application. The rule maker 208 also receives the user indicated rule and the mapped query and structures the final rule that would be queried against the rule book 214.

The rule book 214 may have all the possible rules for different cases which includes the multi-dimensional factors that define the retention period. The determined retention period is provided to the final buffer 216 that broadcasts the same to aggregator 212 and imposes the retention period to the backed up data.

The aggregator 212 is a component that will actually cache the user defined rules, history of the kind of data and conditions from the polling engine and their respective retentions. This information is used to improve the accuracy of the rule book 214 and possible optimal retention periods for that particular enterprise data. This is the module that recommends, to the backup administrator, that the current retention period is becoming obsolete or could lead to data loss and alerts the backup administrator to change or modify or allow the retention management engine 200 to enforce the optimal retention period to the backups at that event or time instance.

Figure 3:
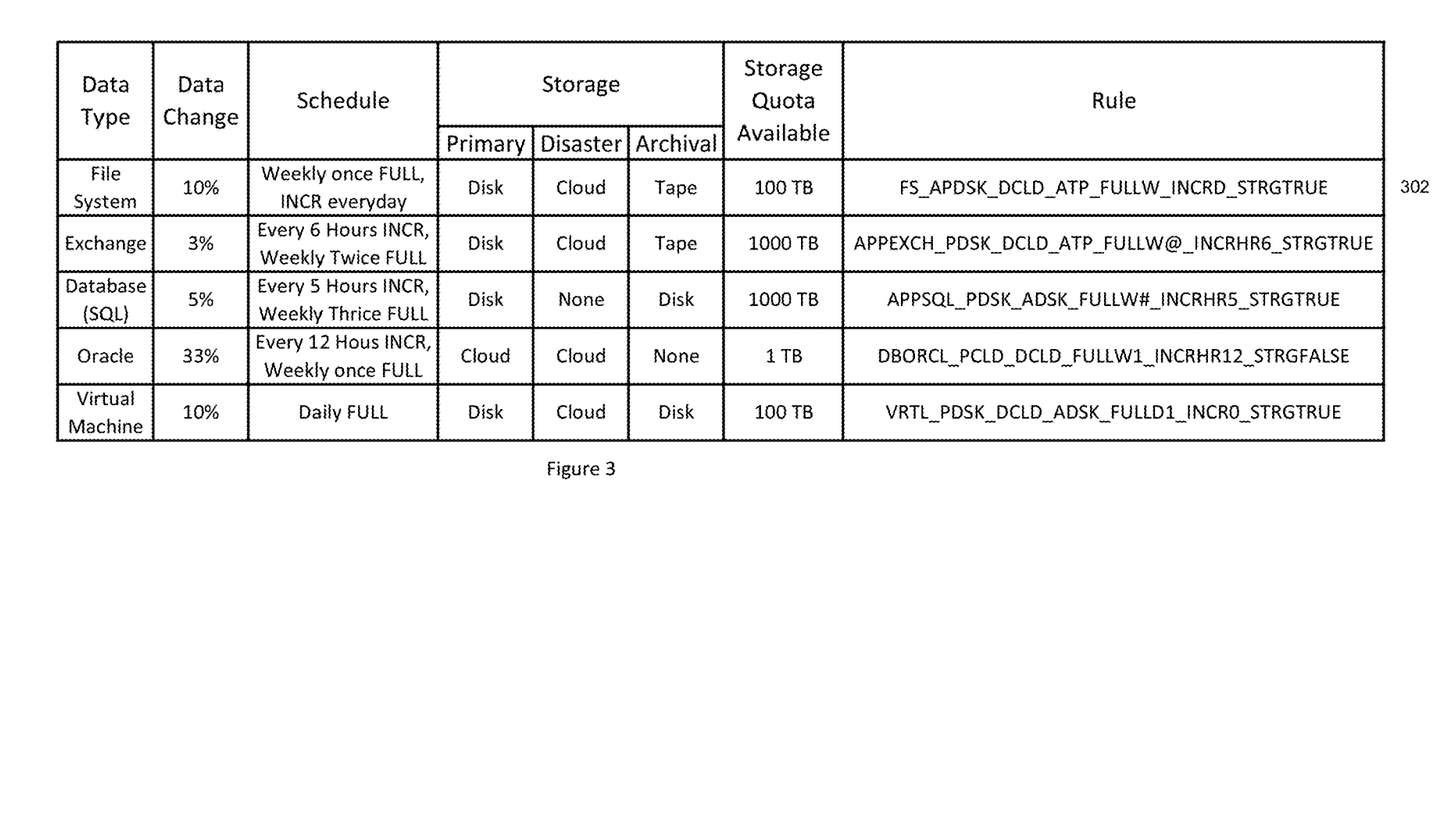
FIG. 3 illustrates a table of organized data and illustrates a query generated by the query mapper.
Figure 4:
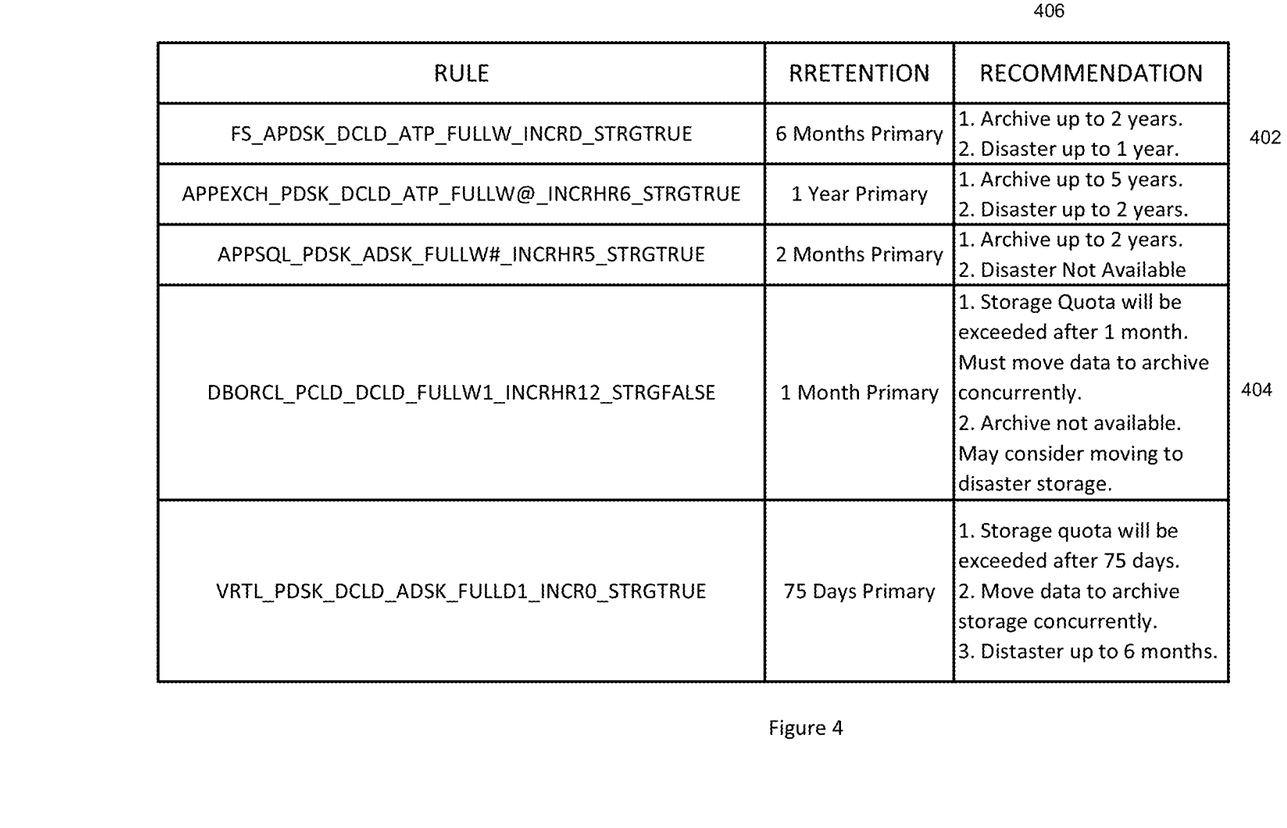
FIG. 4 illustrates a table showing an example of a query that is queried against the rule book.

FIGS. 3 and 4 illustrate an example of an operation of the management engine 200. FIG. 3 illustrates a table of organized data and illustrates a query generated by the query mapper. The table 300 illustrates raw data collected or gathered by the polling engine that has been organized by the data interpreter. The row 302 is treated as exemplary. The raw data collected by the polling engine, as shown in row 302, may include a data type (file system), a change rate (10%), a current backup schedule (weekly once FULL and an INCR (incremental) every day). The raw data may also identify how the backup is stored. For row 302, the file system data type is stored in primary storage (disk), disaster recovery storage (cloud) and archive storage (tape). The raw data also indicates that 100 TB is available as the storage quota.

FIG. 3 illustrates that the raw data collected by the polling engine has been organized (by row in this example). Thus, the data interpreter has organized the raw data into predefined categories or factors (data type, data change, schedule, storage, storage quota available). Using the organized data, the query mapper may form a query to be used by the rule maker. The query, in one example, is shown in the Rule column in FIG. 3. The query for row 302 is FS_APDSK_DCLD_ATP_FULLW_INCD_STRGTRUE. This conveys the organized data as a query. In this example, FS=file system, APDSK=primary storage is disk, DCLD=disaster recovery to cloud, ATP=archive to tape, FULLW=a weekly full backup, INCRD=a daily incremental backup, and STRGTRUE=storage is available. For contrast, row 304 indicates STRGFALSE. This indicates that storage may not be available and indicates that the current retention policy may lead to data loss. Similarly, the other factors can be evaluated to determine whether the storage is being used effectively or whether data loss is possible.

The rule maker 208 thus receives the query from the query mapper 206 and a user-defined retention 210.

FIG. 4 illustrates a query formed by the rule maker 208 and performed against the rule book 214. The query formed by the rule maker 208 may build on the query from the query mapper. In one example, the user defined retention may be incorporated into the query from the query mapper. Row 402 of the table of queries 400 is used as an example. Using the rule from the query mapper A(FS_APDSK_DCLD_ATP_FULLW_INCD_STRGTRUE) and the user defined retention (6 months primary in queries 400), the rule maker identifies a recommendation for this particular rule. The recommendation (in column 406) may be found when the rule and/or retention in row 402 matches an existing rule stored in or accessible to the rule book. In this case, the rule maker or rule recommends archive of up to 2 years and disaster up to one year. This recommendation is published to the aggregator 212 and to the final buffer 216. The backup of the file system is thus performed and retained in accordance with the recommendation from the rule book 214.

In one example, a closest match may be used to identify an existing rule when there is no match to the query. A closest match may allow, for example, variance in one or more factors. Row 404 also illustrates an example, where the recommendation indicates that the current retention policy is not sustainable and that the storage quota will be exceeded. This allows the retention period to be adjusted appropriately, allows the storage quota to be adjusted, or other action be taken to alleviate the potential loss of data.

Figure 5:
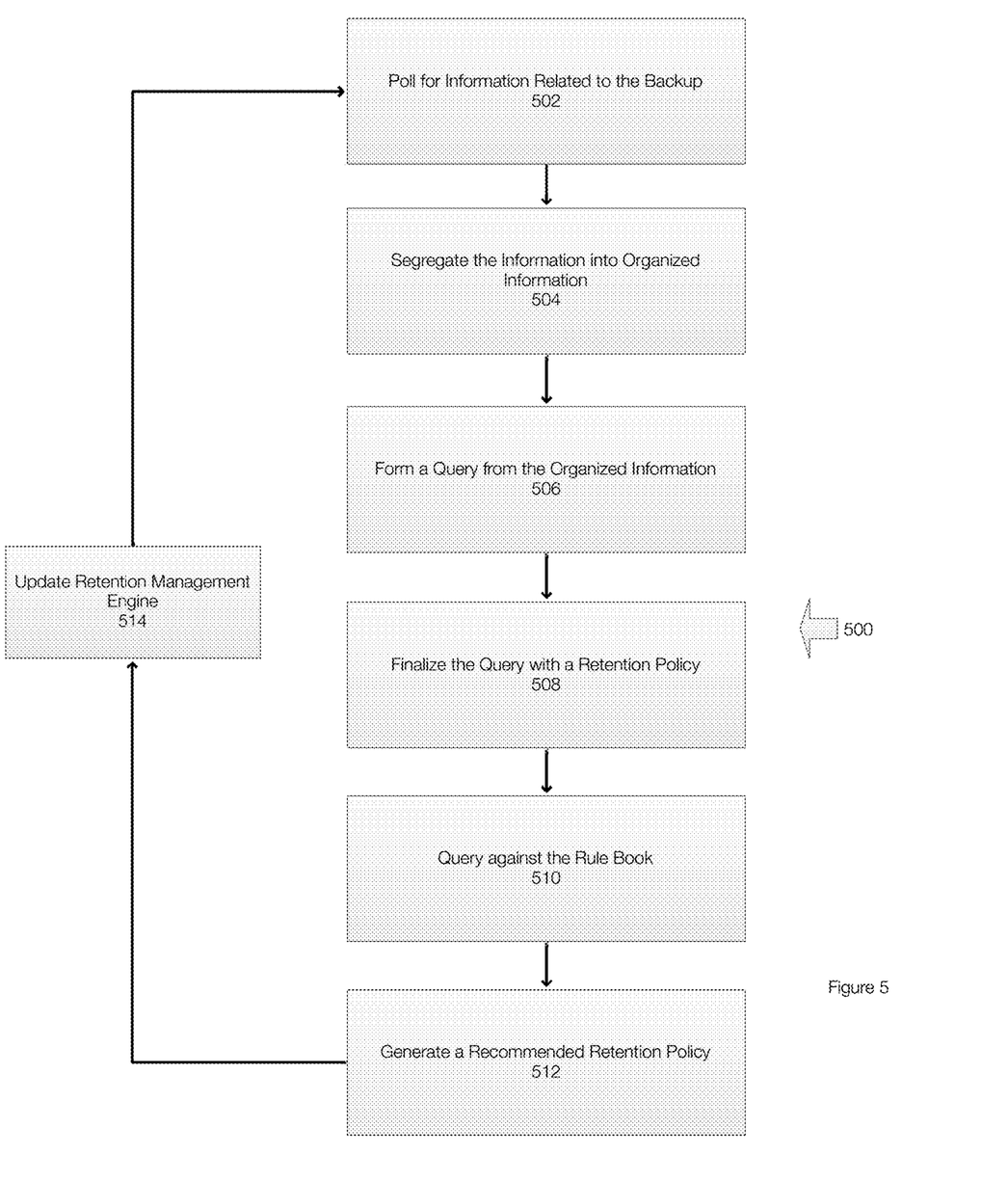
FIG. 5 illustrates an example of a method for determining a retention policy or period for a backup.

FIG. 5 illustrates a flow diagram of an example of a method for determining a retention period. The method 500 may begin by polling 502 for information related to a backup. A polling engine polls one or more devices (e.g., sources, targets, applications) in order to identify information that may be relevant to determining the retention period. This may include, as previously stated, data type, characteristics of host or source device/data, characteristics of target device (available storage), existing procedures, events on the host, and the like. This raw data is thus collected by a polling engine in one example.

Next, the raw data or collected information is segregated 504 or organized into organized information or data. This may include aligning the raw data with predetermined factors. The data interpreter helps the retention management engine to identify and organize the factors that identify the parameters used in rule formation and in designing a rule for retention.

A query is then formed 506 from the organized data. The query is aligned, in one example, with the factors from the host. The query is formed by a query mapper that forms a query that can be used to access a rule book or other database. The rule maker then finalizes 508 the query with a retention policy (if available). More specifically, the rule maker receives the query from the query mapper and takes into account the user-defined retention policy (if any). The rule maker may also receive inputs from the aggregator, which indicates, by way of example only, suggestions based on previous trends of the data. For example, the change rate may be increasing for the data or the data required for the backups may be increasing. With this information, the rule maker may finalize or develop a rule that is queried 510 against the rule book.

The rule book may be a database that includes several queries and retention periods associated with each type of query. The query from the rule maker will be searched for and the respective retention period/policy associated with a found rule is given to the aggregator and a final buffer.

In one example, the rule used as the query is a new rule and there is no matching rule in the rule book. In this case, the aggregator will prioritize the queries in high, medium, and low retainable format. The new rule is added to the rule book and associated with the retention period. The result from the rule book to the policy engine (that enforces the recommended retention period for the backup) is pushed to a final buffer.

The retention a management engine and its various components may be updated 514. This can occur at any point of the method and may be performed continuously as information is added, acquired and processed by the retention management engine. In one example, the aggregator will monitor each and every component of the retention management engine and operate analytically. The aggregator indicates new recommendations to the user as well as these systems to improve the retention and decision making capability. The aggregator may add new rules to the rule book, new categories to the data interpreter, control polling permissions of the polling engine, which is user-defined, or the like. Thus, the aggregator, in one example, may learn from the historical data and improve the operation and recommendations of the retention management engine.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining a retention period for a backup, the method comprising:
   receiving raw data at a polling engine from at least a host, wherein the host includes source data to be backed up during a backup operation and the target device includes storage for storing a backup of the source data and wherein the raw data includes data relevant to determining the retention period for retaining the backup of the source data;
   interpreting the raw data into categories of factors to generate grouped data;
   forming a query from the grouped data by a rule-maker;
   searching a rule book based on the query for a rule that matches the query, wherein the rule that matches the query identifies a recommended retention period for the backup, wherein the rule book associates rules with retention periods and each rule associates a retention period with a specific combination of the raw data that has been grouped into the categories of factors;
generating a backup of the source data;
storing the backup at the target device;
applying the recommended retention period associated with the rule in the rule book that matched the query to the backup; and
optimizing the rule book and formation of the query based on historical data including pervious queries and queries that are overridden such that an accuracy of the rule book is improved and such that a frequency of unacceptable recommended retention periods is reduced.

2. The method of claim 1, wherein receiving raw data from a host includes polling the host and polling the target device and polling the application.

3. The method of claim 1, wherein the target device includes one or more of a primary storage site, a disaster recovery site, and an archive site.

4. The method of claim 1, wherein the raw data is mapped to the categories of factors, the factors including one or more of a data type, a data change, a schedule, a storage type, and a storage quota available.

5. The method of claim 1, further comprising receiving a user-defined retention policy that is added to the query before searching the rule book.

6. The method of claim 1, further comprising adding a rule to the rule book.

7. The method of claim 1, further comprising revising the categories of factors based on historical data associated with the retention periods.

8. The method of claim 1, wherein the rule book stores predetermined rules and recommended retention periods.

9. The method of claim 1, further comprising publishing the retention period to a final buffer, wherein a policy engine enforces the retention period for the backup.

10. A non-transitory computer readable medium comprising instructions for implementing a method for determining a retention period for a backup, the method comprising:
receiving raw data at a polling engine from at least a host, wherein the host includes source data to be backed up during a backup operation and the target device includes storage for storing a backup of the source data and wherein the raw data includes data relevant to determining the retention period for retaining the backup of the source data;
interpreting the raw data into categories of factors to generate grouped data;
forming a query from the grouped data by a rule-maker;
searching a rule book based on the query for a rule that matches the query, wherein the rule that matches the query identifies a recommended retention period for the backup, wherein the rule book associates rules with retention periods and each rule associates a retention period with a specific combination of the raw data that has been grouped into the categories of factors;
generating a backup of the source data;
storing the backup at the target device;
applying the recommended retention period associated with the rule in the rule book that matched the query to the backup; and
optimizing the rule book and formation of the query based on historical data including pervious queries and queries that are overridden such that an accuracy of the rule book is improved and such that a frequency of unacceptable recommended retention periods is reduced.

11. The non-transitory computer readable medium of claim 10, wherein receiving raw data from a host includes polling the host and polling the target device and polling the application.

12. The non-transitory computer readable medium of claim 10, wherein the target device includes one or more of a primary storage site, a disaster recovery site, and an archive site.

13. The non-transitory computer readable medium of claim 10, wherein the raw data is mapped to the categories of factors, the factors including one or more of a data type, a data change, a schedule, a storage type, and a storage quota available.

14. The non-transitory computer readable medium of claim 10, further comprising receiving a user-defined retention policy that is added to the query before searching the rule book.

15. The non-transitory computer readable medium of claim 10, further comprising adding a rule to the rule book.

16. The non-transitory computer readable medium of claim 10, further comprising revising the categories of factors based on historical data associated with the retention periods.

17. The non-transitory computer readable medium of claim 10, wherein the rule book stores predetermined rules and recommended retention periods.

18. The non-transitory computer readable medium of claim 10, further comprising publishing the retention period to a final buffer, wherein a policy engine enforces the retention period for the backup.

* * * * *